US006115666A

United States Patent [19]

Ng

[11] Patent Number: 6,115,666

[45] Date of Patent: Sep. 5, 2000

[54] METHOD AND APPARATUS FOR CREATING A PROFILE OF OPERATING CONDITIONS OF AN ENGINE

[75] Inventor: Paul T. Ng, Vernon Hills, Ill.

[73] Assignee: Outboard Marine Corporation, Waukegan, Ill.

[21] Appl. No.: 09/199,008

[22] Filed: Nov. 23, 1998

Related U.S. Application Data

[63] Continuation of application No. PCT/US97/10469, Jun. 16, 1997.

[60] Provisional application No. 60/020,247, Jun. 21, 1996.

[51] Int. Cl.[7] .......... G06F 17/40

[52] U.S. Cl. .......... 701/115; 701/35

[58] Field of Search .......... 701/35, 102, 115; 73/116

[56] References Cited

U.S. PATENT DOCUMENTS

| | | | |
|---|---|---|---|
| 4,280,185 | 7/1981 | Martin | 701/99 |
| 4,757,454 | 7/1988 | Hisatake et al. | 701/35 |
| 4,787,053 | 11/1988 | Moore | 701/123 |
| 4,853,859 | 8/1989 | Morita et al. | 701/35 |
| 4,858,135 | 8/1989 | Clish et al. | 701/93 |
| 4,866,616 | 9/1989 | Takeuchi et al. | 701/35 |
| 4,939,652 | 7/1990 | Steiner | 701/35 |
| 5,173,856 | 12/1992 | Purnell et al. | 701/35 |
| 5,305,214 | 4/1994 | Komatsu | 701/35 |
| 5,617,821 | 4/1997 | Tsunoda et al. | 123/195 P |
| 5,948,026 | 9/1999 | Beemer, II et al. | 701/35 |

*Primary Examiner*—Andrew M. Dolinar
*Attorney, Agent, or Firm*—Fletcher, Yoder & Van Someren

[57] ABSTRACT

A method and apparatus for measuring and recording various conditions of engine performance and in particular provides a useful record of the speeds at which the engine has been operated over the life of the engine.

19 Claims, 4 Drawing Sheets

Arrangement of bins in RAM & NON Volatile memory

RPM profile constructed using bin counts

METHOD AND APPARATUS FOR CREATING A PROFILE OF OPERATING CONDITIONS OF AN ENGINE

CROSS-REFERENCES TO RELATED APPLICATIONS

This Application is a continuation application of copending International Application Serial No. PCT/US97/10469, filed Jun. 16, 1997 claiming the benefit of U.S. Provisional Application Serial No. 60/020,247, filed Jun. 21, 1996.

BACKGROUND OF THE INVENTION

1. Field of the Invention

The invention relates to methods and apparatus for measuring and recording various conditions of engine performance, and particularly relates to such methods and apparatus applied to the operation of outboard engines.

2. Description of Related Art Including Information Disclosed Under 37 CFR 1.97 and 1.98

It is generally known to provide internal combustion engines with an electronic control unit (ECU) for the monitoring and control of engine operation. It is also known to provide an internal combustion engine with the capacity to generate various electronic signals relating to engine operation. Such signals are commonly utilized as a diagnostic aid in the repair and/or servicing of the engine.

SUMMARY OF THE INVENTION

The invention provides a method and apparatus for constructing an engine speed usage profile for an outboard motor. Such an engine speed profile represents a statistical history of the engine operating speeds at which the engine has been used. This type of historical data regarding the operation of a particular engine, or the habits of a particular boat owner may be useful for a variety of reasons. For example, if a profile indicates that high-speed usage is the norm, then the engine may be optimized or serviced accordingly. Similarly, low engine operating speeds may require different optimization and servicing.

A typical outboard engine operates at engine speeds varying between 600–800 RPM when idling to 5,500–6,000 RPM at wide open throttle. A useful record of the speeds at which the engine has operated can be developed by dividing this range of possible speeds into several subranges, and by sampling the engine speed at predetermined intervals during engine operation to determine in which subrange of speeds the engine is operating for that interval. An on-board computer updates a memory bank to record the sampled data, and can store the data as a near-permanent record. Also, the computer is operable so as to reproduce the data in a useful form at any time during the service life of the engine.

The invention provides a method of operating an internal engine including the steps of providing a sensor for generating a signal corresponding to an engine operating condition; periodically sampling the signal; quantifying the signal as being within one of several possible ranges of values of the signal; and recording the range into which the signal falls.

In one embodiment, the invention provides an engine assembly including an internal combustion engine having an engine operating condition; means for generating a signal corresponding to said condition; means for quantifying the signal as being within one of several possible ranges of values of the signal; and means for recording the range into which the signal falls for that particular interval.

More particularly, the invention provides an outboard motor having an internal combustion engine, a sensor for producing a signal indicating a condition of operation of the engine, such as engine speed, and an ECU operably connected to the sensor for receiving and recording the signal. More particularly, the ECU includes a microprocessor, a quantity of random access memory (RAM), a quantity of non-volatile or read only memory (ROM), and an internal clock or interval counter. It is understood that today, non-volatile memory is not quite the same as ROM (read only memory). Both Flash and EEPROM are examples of non-volatile memory from which data can be read or to which data can be written. This is different from the EPROM which is a non-volatile memory but requires ultraviolet light to erase the contents. Both RAM and ROM are used because of the relative expense of ROM to RAM, and because ROM tends to have a limited number of read/write cycles that limit the number of times ROM can be updated to record a profile. RAM can be updated without significant risk of reaching a read/write cycle limit and is relatively inexpensive. However, the permanent nature of non-volatile ROM is highly desirable and would be lacking if only RAM were available.

During engine operation, the ECU periodically samples the signal generated by the sensor and identifies the signal as falling within a range of signals corresponding to a range of possible engine operating parameters, e.g., engine temperature, engine speed, fuel pressure, oil pressure, etc. The interval counter sets the duration of the interval, or the frequency of sampling, which is anticipated to be on the scale of once per second.

In the case of engine speed, the interval counter will indicate that the engine speed signal should be sampled, and the microprocessor will quantify the signal then being received from the frequency counter. The then current engine speed will fall within one of the predetermined ranges of engine speeds. Various registers in both the RAM and ROM are identified as “bins” corresponding to the various ranges of engine speeds. Accordingly, the RAM and ROM registers are grouped into several bins. The microprocessor then updates the appropriate RAM bin to indicate that the engine was running within a range of engine speeds for that particular interval. Over the course of a session of engine operation, the RAM is thus updated according to the actual operation of the engine.

Upon the ending of the session of engine operation, e.g., when the motor is turned OFF, the ECU transfers the data recorded in RAM to the ROM, so that the fully updated RAM data corresponding to the terminated operating session is added to data corresponding to prior sessions contained in the ROM bins. Various schemes can be used to transfer the data from the RAM to the ROM, including compression of the data to permit the use of less non-volatile memory than RAM. Also, the interval counter can be used in conjunction with the ROM to generate the profile of engine operation by providing the total elapsed engine operation time interval over which the data in the ROM bins was collected.

The invention also provides a method of engine operation that results in the compilation of data reflecting actual engine operating conditions. The method of engine operation includes the steps of providing an internal combustion engine, and a sensor for providing a signal corresponding to an engine operating condition. The method also includes the step of periodically sampling the signal. The method also includes the subsequent step of quantifying the signal as being within one of several possible ranges of values of the signal, and then recording the range into which the signal falls for that particular interval.

One of the advantages provided by the invention is the compilation of a historical record of actual engine operation data taken in a statistically meaningful manner. The sampling rates are high enough to provide a tremendous number of data points for each session of engine operation. Also, the invention provides a means by which this compilation of data is accurately stored. The storage means also provides a means for reviewing the compiled data.

The invention also provides advantage by being highly reliable and economical.

Other features and advantages of the invention will become apparent to those skilled in the art upon review of the following detailed description, claims, and drawings.

BRIEF DESCRIPTION OF THE DRAWINGS

These and other features of the present invention will be more fully disclosed when taken in conjunction with the following DETAILED DESCRIPTION OF THE PREFERRED EMBODIMENT(S) in which like numerals represent like elements and in which.

Figure 1:
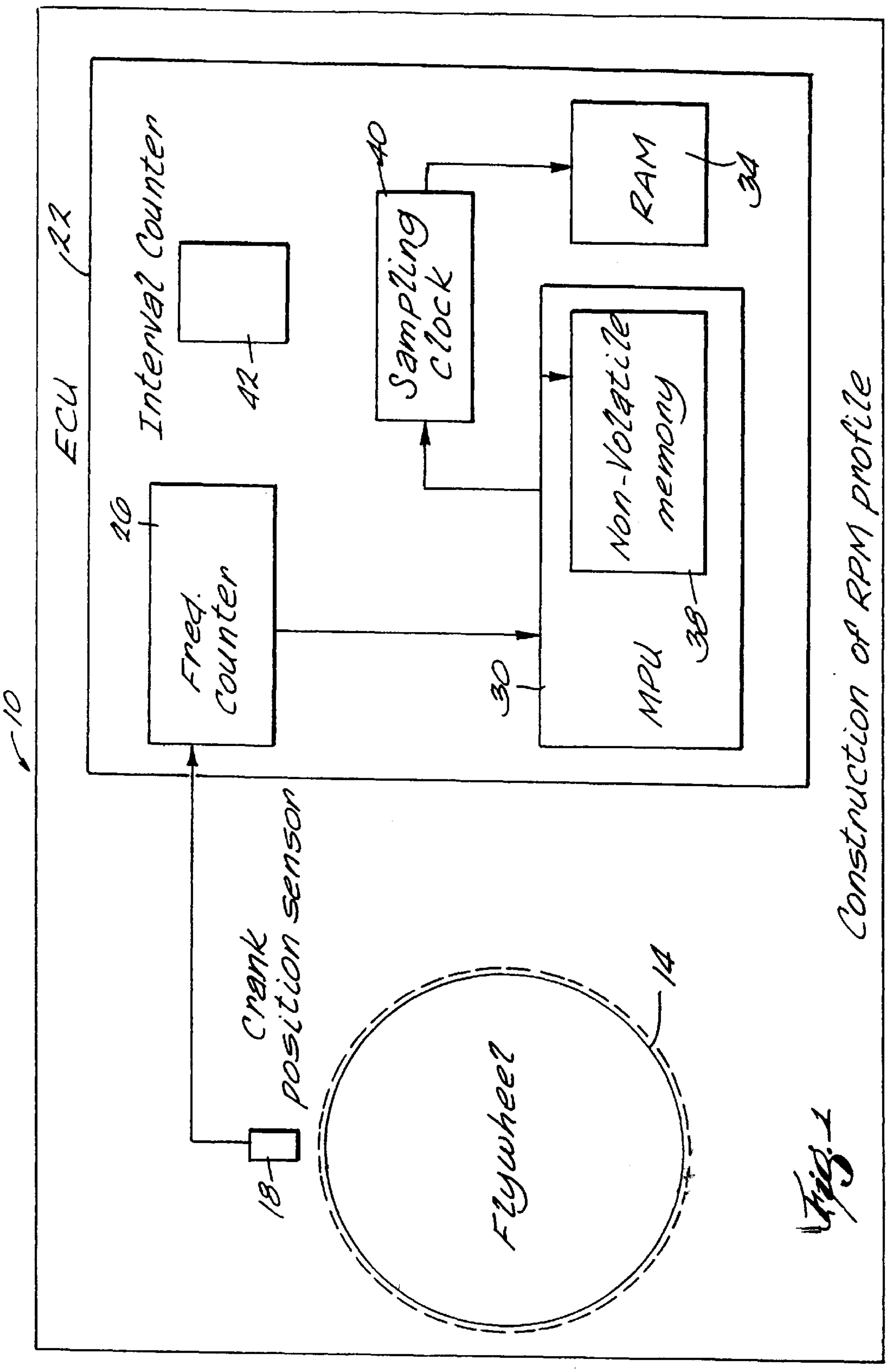
FIG. 1 is a schematic illustration of a motor embodying the invention.

Before several embodiments of the invention are explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein are for the purpose of description and should not be regarded as limiting.

DETAILED DESCRIPTION OF THE PREFERRED EMBODIMENT(S)

The drawings illustrate an outboard engine 10 embodying the invention. Referring first to FIG. 1, the engine 10 includes a flywheel 14 which rotates during operation of the engine 10, and a sensor 18 associated with the flywheel 14 for producing a signal corresponding to one of a variety of engine operating conditions, in this case, engine speed. The engine 10 can be operated to produce various engine operating signals, and engine speed is presently disclosed as an example of how such signals can be recorded for later use.

The engine 10 has a range of operating speeds, typically between 600 RPM to 6000 RPM. This overall range of speeds can be divided into several ranges for compiling a profile of engine speed usage:

| ZONE or BIN | RPM RANGE |
|---|---|
| 1 | 0256–1024 |
| 2 | 1025–2048 |
| 3 | 2049–3072 |
| 4 | 3073–4096 |
| 5 | 4097–5120 |
| 6 | 5121–6144 |
| 7 | 6145+ |

This particular zoning of engine speeds is only one of many possible, but is particularly convenient for use in connection with a microprocessor because all of the break points are divisible by $2^{10}$ (1024).

The engine 10 also includes an ECU 22 operably connected to the sensor 18 for receiving and recording the signal. More particularly, the ECU 22 includes frequency counter 26, a microprocessing unit 30 (MPU), a random access memory 34 (RAM), a non-volatile or read only memory 38 (ROM), and an internal timing unit such as clock 40 or interval counter 42.

The interval counter 42 sets the duration of the interval, or the frequency of sampling, which is preferably once per second. In order for the RPM profile to be somewhat accurate, the sampling rate has to be high, i.e., the interval over which an engine speed is measured has to be short. The larger the sampling period, the more variation in RPM over the course of the period will not be recorded. Also, as discussed below, the interval counter 42 is used to record a running total of engine operation time. The interval counter 42 provides the sampling interval, 1 second, 2 seconds, 4 seconds, $2^n$ (n being an integer) and so on. That is, the data collected in the bin is collected at the rate indicated by the interval counter. Thus if the interval counter is 1, the data collected in the bin is sampled (or collected) at 1-second intervals. The total amount of time is equal to the bin count multiplied by the value in the interval counter. For example, if a bin count is 20, the interval count is 1, the total time that the engine dwells in the RPM range represented by the bin is, in this case, equal to 20×1=20 seconds. On the other hand, if the interval count is 2, then the total in the bin is 20×2=40 seconds. The interval timer can be used along with the bin counts to reproduce the total engine operating time. By itself, it represents the sampling rate of a multiplication factor for the bin counts.

Figure 2:
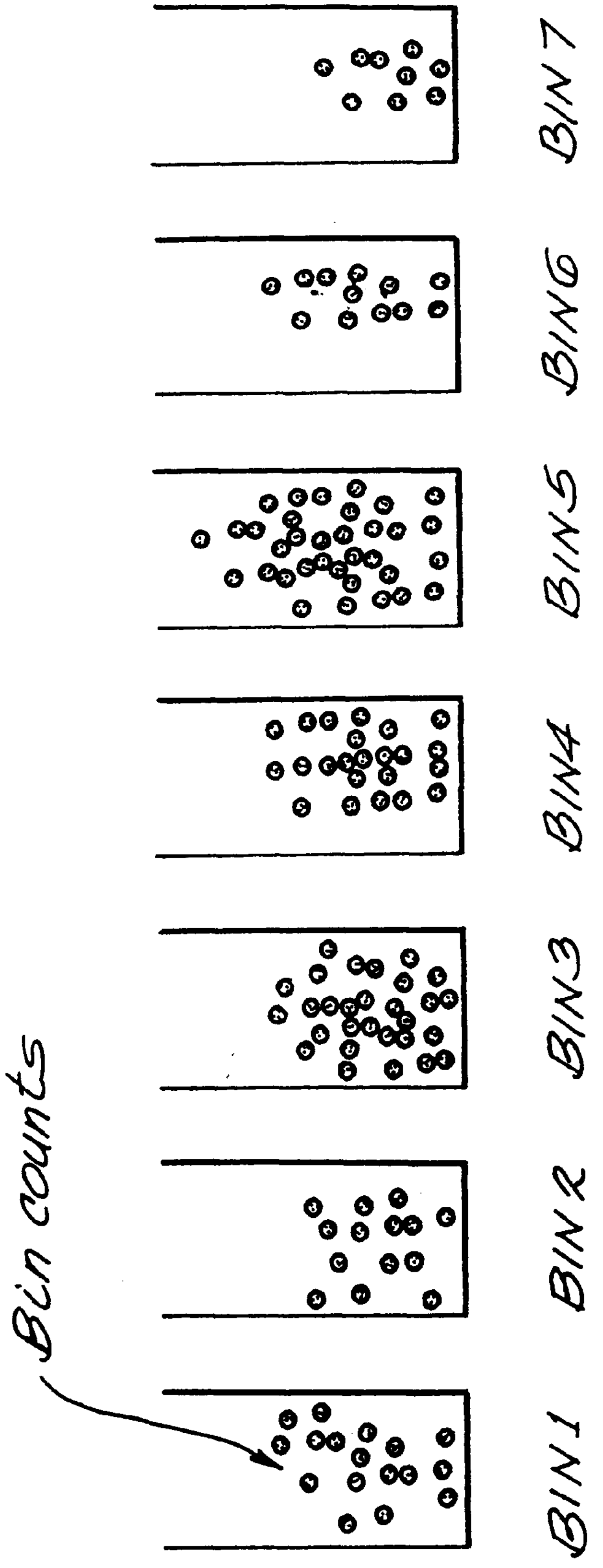
FIG. 2 is a schematic drawing of operation of the motor illustrated by FIG. 1 corresponding to a particular range of engine speeds.

Various registers of the RAM 34 and ROM 38 are identified as “bins” corresponding to the various ranges of engine speeds. Accordingly, in the illustrated embodiment (see FIG. 2), the RAM and ROM 34, 38 each have several bins respectively numbered 1–7 corresponding to a particular range of engine speeds. The RAM bins track the RPM profile when the engine is running, and the ROM bins receive the data from the RAM bins periodically for long-term retention. The RAM and ROM bins are constructed with equal amounts of storage capacity, preferably three bytes of memory. This amount of memory will provide ample capacity to store engine operation data for $2^{24}$ seconds, which approximates five years of running time, and even longer if data compression techniques are used when interval counts are increased. By changing the interval counter to 2, the run time can be doubled to 10 years. The data compression technique is employed to reduce the amount of non-volatile memory used. The non-volatile memory may be a scarce resource depending on the microcomputer chosen. There are disadvantages to this arrangement wherein the RAM and ROM are of equal sized capacity, however, and such data compression techniques will be discussed below.

The frequency counter 26 initially receives the signal from the sensor 18 and conditions the signal so as to be readable by the MPU 30. When the interval counter 42 indicates that the signal from the frequency counter 26 should be sampled, the MPU 30 quantifies the signal to determine in which RPM range the engine 10 is operating, and updates the appropriate RAM bin. The sampled engine speed will correspond to one of the RAM bins, and that RAM bin will be incremented.

Over the course of a session of engine operation, the RAM bins will have recorded engine speed counts corresponding to engine speed usage for that session, and these bin counts will represent the RPM profile.

Also, the duration of the session of engine operation is recorded. This overall elapsed running time can be readily calculated through multiplication of the number of bin counts in the several bins by the interval length. More particularly, the interval counter 42 acts as a scaler which has a value of $2^n$, where n is the interval length. If a bin contains X counts, and the interval is one second (n=1), then the duration of the time recorded (T) is calculated by the expression:

$$T = X \times 2^1 = 2X.$$

For example, if a bin contains 2500 counts, then the operational time for the corresponding engine speed range would be 5000 seconds.

Upon the ending of the session of engine operation, i.e., when the engine 10 is turned OFF or when the battery of the engine 10 is disabled, or at whatever interval the interval counter 42 determines that the ROM 38 should be updated, the ECU 22 transfers the data recorded in RAM bins to the corresponding ROM bins. In this manner, the RAM data for the most recent operating session is added to data which was gathered from prior sessions and which is contained in the ROM bins. The compilation of data in the ROM 38 is a near-permanent record of data collected over the service life of the engine 10, and can be downloaded to provide a profile of engine speed usage for that period of time.

Both RAM and ROM are used in the ECU 22 because of the relative expense of ROM to RAM, and because ROM tends to have a limited number of read/write cycles which limit the number of times ROM can be updated to record a profile. Also, the updating of ROM bins takes longer than the updating of the RAM and is therefore unsuitable for receiving bin counts as frequently as the desired sampling rate.

RAM 34 can be updated without significant risk of reaching a read/write cycle limit and is relatively inexpensive. However, the permanent nature of non-volatile ROM 38 is highly desirable and would be lacking if only RAM 34 were available. Discussed below is an alternative for compiling and preserving an RPM profile using unequal amounts of RAM and ROM.

Figure 3:
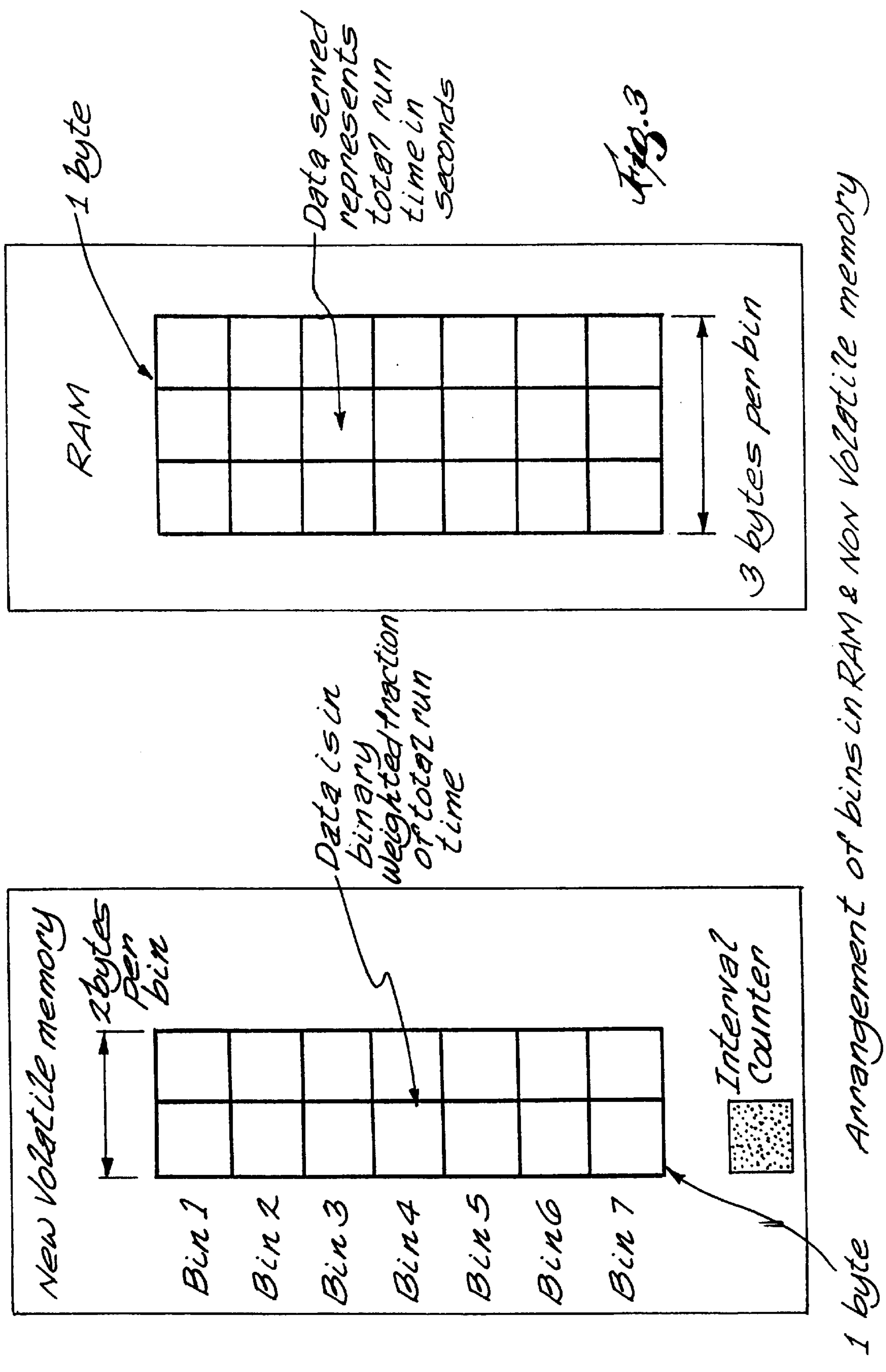
FIG. 3 is a schematic comparison of the volatile and non-volatile memory used by the motor illustrated by FIG. 1.

In the above-described operation of the engine 10, the RAM and ROM were of equal capacity, and there is no need for conversion or manipulation of gathered data in the transfer from RAM to ROM; the data is simply initially gathered in RAM bins and accumulated in corresponding ROM bins. The engine 10 can also be operated and an RPM profile generated, however, through use of RAM having bins of three bytes and ROM having bins of two bytes. See FIG. 3. In the event that unequal bytes are used for the respective RAM and ROM bins, the data gathered in RAM must be compressed prior to the transfer of the data from the RAM bins into a ROM profile.

While various methods of data conversion can be successfully used, in the disclosed embodiment of the engine 10, the microprocessor 30 initially converts the signal from the frequency counter 26 into a binary weighted fraction, which is retained by the RAM 34. The binary weighted fraction is then converted into a binary weighted percentage when the session data is transferred from the RAM 34 to the ROM 38. The microprocessor uses the following expressions for the calculation of these values:

$$\text{Binary Weighted Fraction}_i = \frac{S_i}{\sum_{i=1}^{i=7} S_i} \times 2^{16}$$

wherein $S_i$ represents the bin count for a single bin. This calculated value is retained by the RAM.

The percentage representation of total run time, wherein $S_i$ is the bin count at $\text{bin}_i$ is expressed as:

$$\text{Percent Fraction } F_i = \frac{S_i}{\sum_{i=1}^{i=7} S_i} \times 100\%$$

This percentage is retained by the ROM 38.

Thus a hexadecimal of $FFFF (65536) in a particular bin would correspond to 100% and a hexadecimal of $0 corresponds to 0%. The percentages are retained in the ROM bins during engine shutdown or whenever the interval counter 42 requires the ROM 38 to be updated. When the ECU 22 is started for a new engine operating session, the reverse calculation is carried out: the bin percentages in the ROM are multiplied by the total running time and the RAM bins are loaded with an absolute count, which is then further increased during the next engine operating session.

Figure 4:
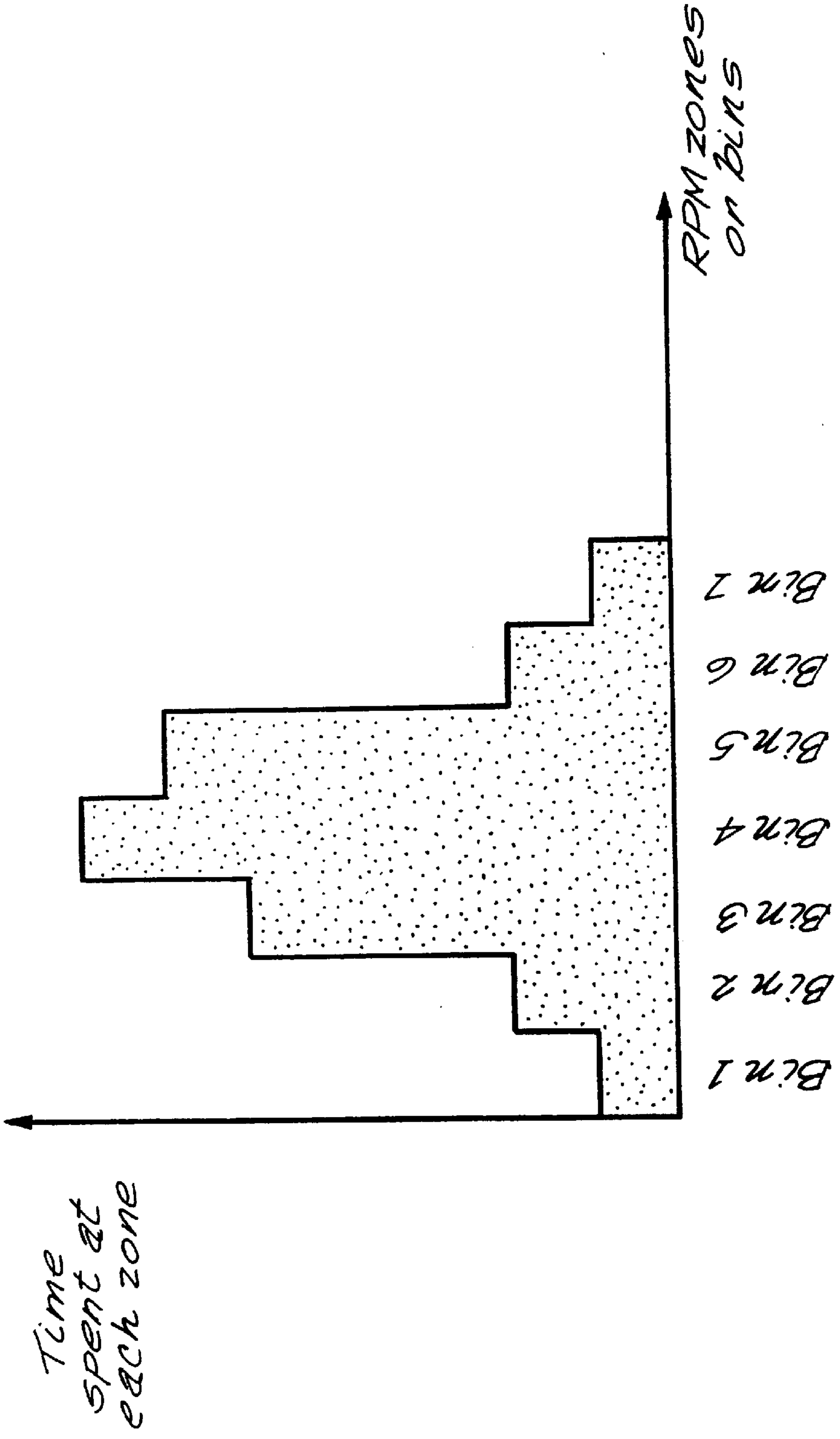
FIG. 4 illustrates an example presentation of data compiled by the engine illustrated by FIG. 1.

Using the bin counts, the RPM profile can be easily constructed. Such RPM profile is best represented as a percentage. In the present ECU design, there is an accumulated engine run clock. This is not depicted in this disclosure. In order to find how long the engine stays in a particular RPM zone, the percentage of time in a particular RPM zone is used to multiply the total engine run time to find out how long the engine ran in the particular RPM zone. For example, a bar chart such as that shown in FIG. 4 shows the percentage of time a user has spent in each of the several ranges of speeds.

The invention thus provides a method of operating an internal combustion engine, the method including the steps of providing a sensor for generating a signal corresponding to an engine operating condition; periodically sampling the signal; quantifying the signal as being within one of several possible ranges of values of the signal; and recording the range into which the signal falls.

The invention also provides a method of operating the engine to compile data reflecting actual engine operating conditions. The method of engine operation includes the steps of providing an internal combustion engine and a sensor for providing a signal corresponding to an engine operating condition. For example, the providing step could include providing an engine including the crankshaft and the sensor for providing the signal.

The method also includes the step of periodically sampling the signal. This step preferably entails sampling the signal at a rate of approximately once per second. The method also includes the subsequent step of quantifying the signal as being within one of several possible ranges of values of the signal, and then recording the range into which the signal falls for that particular interval. The recording step could be accomplished using RAM. The recording step further includes the transferal of the data collected in RAM to a more permanent medium, such as ROM.

Other features and advantages of the invention are set forth in the following claims.

The corresponding structures, materials, acts, and equivalents of all means or step plus function elements in the claims below are intended to include any structure, material, or act for performing the function in combination with other claimed elements as specifically claimed.

What is claimed is:

1. A method of operating an internal combustion engine, said method comprising the steps of:

providing a sensor for generating a signal corresponding to an engine operating condition;

providing an on-board data recording system having temporary and permanent memory for recording ranges of values of the signal;

periodically sampling the sensor generated signal to obtain the signal values;

quantifying the sampled signal values as being within one of several possible ranges of values;

maintaining short-term arithmetic totals of the ranges in the temporary memory in the on-board data recording system; and periodically adding the short-term arithmetic totals of the ranges stored in the temporary memory to long-term arithmetic totals of the ranges of values stored in the permanent memory in the on-board data recording system.

2. The method of claim 1 further including the steps of:

sensing engine RPM as said engine operating condition; and generating a corresponding signal value.

3. The method of claim 2 further including the steps of:

establishing a plurality of predetermined ranges of engine RPM;

comparing said sampled signal value with each of said plurality of predetermined ranges of engine RPM;

providing a signal value data storage area for each of said predetermined ranges of engine RPM; and storing said sampled signal value in the data storage area that has the RPM range that includes said sampled signal value.

4. The method of claim 1 comprising the steps of:

providing a first data storage area for temporarily storing said sampled signal values; and transferring said stored, sampled, signal values from said first data storage area to a second data storage area to update the totals of the ranges of values for relatively permanent data storage.

5. The method of claim 4 further comprising the steps of:

updating the first data storage area with sampled signal values at various intervals only during continuous engine operation; and transferring the updated sampled signal values in the first data storage area to said second data storage area for said relative permanent storage only after the engine operation has ceased.

6. The method of claim 4 further including the steps of:

using a random access memory as said first data storage area; and using a read only memory as said second data storage area.

7. The method of claim 6 further including the steps of:

providing a unit for time sampling said sensor generated signal to obtain said signal value; and using a computer to record a running total of engine operating times such that data stored in said read only memory is correlated with said time sampling unit to generate a profile of said engine operating condition.

8. The method of claim 1 further including the step of using a data compression technique to store the range totals in the permanent memory of the on-board data recording system.

9. The method of claim 1 further including the step of varying lengths of intervals for periodic sampling of the sensor generated signal.

10. An engine assembly comprising:

an internal combustion engine having an engine operating condition;

a sensor for generating a data signal value corresponding to said condition over a selected time interval;

a computer for quantifying the data signal value as being within one of several possible ranges of values, and for maintaining an arithmetic total of the intervals in which the signal value falls within each of the several possible ranges of values; and an on-board data storage device for permanently recording the arithmetic total of the intervals in which the signal value falls within each of the several possible ranges of values.

11. The engine assembly of claim 10 further including:

a timing unit for periodically sampling for said selected time interval said data signal value generated by said sensor during engine operation; and the computer being coupled to said timing unit and said data storage device for determining engine operating time and for selectively generating a profile of said engine operating condition versus total engine operating time.

12. The engine assembly of claim 10 wherein said sensor generates a signal value corresponding to engine RPM as said engine operating condition.

13. The engine assembly of claim 12 wherein said data storage device comprises:

a random access memory for temporary storage of said RPM data signal generated by said sensor; and a read only memory associated with said random access memory for relatively permanent storage of said RPM data signal such that said computer correlates data values stored in said read only memory with said running total of engine operating time to generate said engine profile of RPM values versus said total engine operating time.

14. The engine assembly of claim 10 wherein the computer is further configured to compress data representative of the range totals.

15. The engine assembly of claim 10 wherein the computer is further configured to vary the selected time intervals.

16. An outboard motor comprising:

a rotatable crankshaft;

a sensor for generating a data signal corresponding to rotation of said crankshaft;

an on-board electronic control unit for receiving said data signal and storing counts for ranges of values of the data signal at sampling intervals, said electronic control unit including:

an interval timer;

random access memory and a non-volatile memory; and a microprocessor;

said electronic control unit being configured to sample said data signal at a first predetermined interval, to classify said data signal values as being within one of the ranges of values, to maintain a running total in the random access memory of counts of intervals in which the data signal values fall within each of the ranges of values, and to transfer said counts of intervals from said random access memory into said non-volatile memory at a variable interval.

17. An outboard motor as in claim 16 wherein said electronic control unit transfers said sampled data signal from said random access memory to said non-volatile memory each time said outboard motor ceases operation.

18. An outboard motor as in claim 16 wherein said electronic control unit is configured to compress data stored in said non-volatile memory.

19. An outboard motor as in claim 16 wherein the electronic control unit is further configured to vary the interval timer intervals.

* * * * *